United States Patent
Abdelkader et al.

(10) Patent No.: US 10,549,999 B2
(45) Date of Patent: Feb. 4, 2020

(54) PRODUCTION OF GRAPHENE

(71) Applicant: The University of Manchester, Manchester (GB)

(72) Inventors: Amr Abdelkader, Manchester (GB); Ian Kinloch, Manchester (GB); Robert Dryfe, Manchester (GB)

(73) Assignee: THE UNIVERSITY OF MANCHESTER, Manchester (GB)

( * ) Notice: Subject to any disclaimer, the term of this patent is extended or adjusted under 35 U.S.C. 154(b) by 5 days.

(21) Appl. No.: 15/765,062

(22) PCT Filed: Oct. 7, 2016

(86) PCT No.: PCT/EP2016/074010
§ 371 (c)(1),
(2) Date: Mar. 30, 2018

(87) PCT Pub. No.: WO2017/060433
PCT Pub. Date: Apr. 13, 2017

(65) Prior Publication Data
US 2018/0282164 A1    Oct. 4, 2018

(30) Foreign Application Priority Data
Oct. 8, 2015 (GB) .................................. 1517784.3

(51) Int. Cl.
*C25B 1/00* (2006.01)
*C01B 32/196* (2017.01)
*C01B 32/215* (2017.01)

(52) U.S. Cl.
CPC .......... *C01B 32/196* (2017.08); *C01B 32/215* (2017.08); *C25B 1/00* (2013.01); *C01B 2204/04* (2013.01)

(58) Field of Classification Search
CPC ......... C25B 1/00; C01B 32/20; C01B 32/182; C01B 32/22; C01B 32/19; B82Y 40/00; B82Y 30/00
See application file for complete search history.

(56) References Cited

U.S. PATENT DOCUMENTS

2011/0319554 A1    12/2011    Frazier et al.
2013/0299359 A1    11/2013    Ling et al.
(Continued)

FOREIGN PATENT DOCUMENTS

EP    2 878 709 A1    6/2015
WO    2012/120264 A1    9/2012
(Continued)

OTHER PUBLICATIONS

Singh et al., Greener Electrochemical Synthesis of High Quality Graphene Nanosheets Directly from Pencil and its SPR Sensing Applicaiton, (2012), Advanced Funtional Materials, vol. 22, pp. v2352-v2362.*

(Continued)

*Primary Examiner* — Arun S Phasge
(74) *Attorney, Agent, or Firm* — Seed IP Law Group LLP

(57) ABSTRACT

Methods for the production in an electrochemical cell of graphene and graphite nanoplatelet structures having a thickness of less than 100 nm in a cell having a negative electrode which is graphitic and an electrolyte which consists of ions in a solvent, where the cations are sulfur-containing ions or phosphorus containing ions, wherein the method comprises the step of passing a current through the cell to intercalate ions into the graphitic negative electrode so as to exfoliate the graphitic negative electrode.

20 Claims, 2 Drawing Sheets

(56) References Cited

U.S. PATENT DOCUMENTS

2014/0107326 A1    4/2014   Swager et al.
2014/0275597 A1    9/2014   Zhang et al.
2015/0207176 A1    7/2015   Moganty et al.

FOREIGN PATENT DOCUMENTS

WO    2013/132261 A1    9/2013
WO    2015/019093 A1    2/2015
WO    2015/158711 A1    10/2015
WO    2016/031081 A1    3/2016

OTHER PUBLICATIONS

International Search Report and Written Opinion, dated Feb. 13, 2017, for International Application No. PCT/EP2016/074010, 16 pages.

Najafabadi et al., "Synergistic production of graphene microsheets by simultaneous anodic and cathodic electro-exfoliation of graphitic electrodes in aprotic ionic liquids," *Carbon* 84:449-459, 2015.

\* cited by examiner

PRODUCTION OF GRAPHENE

This application claims priority from GB1517784.3 filed 8 Oct. 2015, the contents of which are herein incorporated by reference in their entirety.

FIELD OF INVENTION

The present invention relates to an electrochemical method for the production of graphene and related graphite nanoplatelet structures.

BACKGROUND

Graphene is an atomically thick, two dimensional sheet composed of sp2 carbons in a honeycomb structure. It can be viewed as the building block for all the other graphitic carbon allotropes. Graphite (3-D) is made by stacking several layers of graphene on top of each other, with an interlayer spacing of ~3.4 Å and carbon nanotubes (1-D) are a graphene tube.

Single-layer graphene is one of the strongest materials ever measured, with a tensile strength of ~130 GPa and possesses a Young's modulus of ~1 TPa. Graphene's theoretical surface area is ~2630 m2/g and the layers are gas impermeable. It has very high thermal (5000+W/mK) and electrical conductivities (up to 6000 S/cm). The observed superior properties of graphene introduced it as a potential candidate material for many applications including but not limited to:
(a) additive for mechanical, electrical, thermal, barrier and fire resistant properties of a polymer;
(b) surface area component of an electrode for applications such as fuel cells, super-capacitors and lithium ion batteries;
(c) conductive, transparent coating for the replacement of indium tin oxide; and
(d) components in electronics.

Graphene was first reported in 2004, following its isolation by Professor Geim's group at The University of Manchester. Graphene research since then has increased rapidly. Much of the "graphene" literature is not on true monolayer graphene but rather two closely related structures:
(i) "few layer graphene", which is typically 2 to 10 graphene layers thick. The unique properties of graphene are lost as more layers are added to the monolayer and at 10 layers the material becomes effectively bulk graphite; and
(ii) Graphene oxide (GO), which is a graphene layer which has been heavily oxidised in the exfoliation process used to make it and has typically 30 at % (atomic percentage) oxygen content. This material has inferior mechanical properties, poor electrical conductivity and is hydrophilic (hence a poor water barrier).

There are a variety of methods to produce graphene [Ruoff 2009]. Novoselov et al. produced their first flakes by the mechanical exfoliation of graphite by using an adhesive tape to isolate individual layers [Novoselov 2004]. It has been shown subsequently that graphite can also be exfoliated by using ultrasonic energy to separate the layers when in an appropriate solvent, such as NMP (N-methyl pyrrolidone) [Coleman 2008 & 2009].

Graphite is an allotrope of carbon, the structure of which consists of graphene layers stacked along the c-axis in a staggered array usually denoted as ABAB. The layers are held together by weak van der Waals forces so that the separation between layers is 0.335 nm. Graphite is a cheap and abundant natural material, which makes it an excellent raw material for inexpensive production of graphene.

As noted above, graphite has been used to make graphene via exfoliation, wherein the stacked layers of graphite are separated to produce graphene. This has been achieved by using ultrasound (ultrasonic exfoliation, USE) and also by intercalating compounds into the graphite interlayer structure so as to weaken the interlayer bonding and promote layer separation.

There are two routes that have been reported to intercalate compounds into graphite structure: chemical and electrochemical. The chemical method is based on the direct reaction of solid graphite materials with the intercalation species (usually in liquid or vapour phase). This process is kinetically slow and usually assisted by sonication or heating. The second route, the electrochemical approach, involves generating the intercalated species through an electrochemical reaction on a graphite cathode or on a graphite anode.

The most famous example of the electrochemical approach is based on the lithium ion battery. For decades, graphite was used as negative electrode in a lithium ion battery due to its high electrical conductivity and its ability to host lithium between the graphene layers. The lithium-graphite intercalation compounds decompose readily in water giving rise to lithium hydroxide and free standing graphene sheets. Loh et al. mimicked the lithium ion battery principle to intercalate Li into graphite and then applied a sonication step to exfoliate graphite [US 2013/0102084 A1, and WO 2011/162727]. This work is also discussed in a related paper [Wang 2011]. However, due to the slow kinetic nature of the intercalation process, the lithium was limited to the areas close to the edges. Upon exfoliation in water, graphite with expanded edges was produced and further intercalation, water decomposition and sonication steeps were needed to achieve exfoliation.

Liu et al. [Liu 2008] reported the exfoliation of graphite using an ionic liquid-water mixture electrolyte to form "kind of IL-functionalized" graphene nanosheets. Scheme 1 in this paper suggests that the material was produced by the exfoliation of the anode but in their discussion the authors mention the role of the cation. Lu subsequently studied the route in more detail and discussed the possible mechanism involved in the production process [Lu 2009]. In their paper, they stated "according to the proposed mechanism by Liu, the positively charged imidazolium ion is reduced at the cathode to form the imidazolium free radical which can insert into the bonds of the graphene plane. At the fundamental level, there are several questionable aspects about the radical-insertion mechanism proposed by Liu, especially when the ILs are mixed with water at 1:1 ratio and where an operational voltage as high as 15 V is applied". Lu et al. showed that the graphene nanosheet production is exclusively at the anode and is due to an interaction of decomposed water species and the anions from the ionic liquid, such as $BF_4$.

The present inventors reported in WO2012120264-A1 the exfoliation of graphite through the electrochemical ammonium-graphite intercalated compound. Without sonication or repeating the intercalation/decomposition steps, the product was few layer graphene with a particle size in the submicron level. Swager and Zhong [Zhong 2012] proposed a method to intercalate graphite with Li and then with ammonia in two separate steps. However, due to the expanding nature of the cathode, the electrodes distance was initially large and hence high voltage was applied to overcome the high internal resistance (IR) drop. As a result, the organic solvent used as electrolyte dissociated at later stages of the process and hindered the intercalation process. Therefore, an additional sonication step was necessary to achieve reasonable exfoliation.

Huang et al [Huang 2012] have used molten LiOH at 600° C. to generate intercalated $Li_xC_y$ species via an in-situ reduction process. Huang reports that it is the reduced $Li_xC_y$ species (and not the Li ions) that causes the desired expansion of the graphite. The expanded graphite is subsequently exfoliated in a distinct, separate aqueous sonication step.

For completeness it is noted that under the right conditions the fragments from the disintegrated negative electrode can be nanoscale forms of a carbon. The production of carbon nanotubes from the intercalation of alkali metal ions into a graphite cathode has been reported by Kinloch et al. [Kinloch 2003]. These nanotubes were produced using a molten alkali halide electrolyte at high temperatures (600° C. or higher). In addition to carbon nanotubes, graphite platelets, carbon nanoparticles and amorphous structures were observed. However, no graphene was reported.

As is clear from the discussion above, a disadvantage of reported methods is that they produce a mixture of materials dispersed in solution (centrifugation is needed for separation). Furthermore, desirable yields of monolayer samples can only be achieved with prolonged application of ultrasonic exfoliation (USE) meaning that the lateral flake dimensions are very small (<1 micron), thus precluding many applications in electronic devices. Furthermore, the large-scale use of power ultrasound has raised safety concerns amongst industrial parties.

Another electrochemical method has been introduced, in WO201/132261, whereby double intercalation of graphite occurs with metal and organic ions. This method does not use any sonication, but it can suffer from decomposition of the organic solvent depending on the conditions used.

A yet further electrochemical method, in WO2015/019093, uses solvent-free ionic electrolytes where the electrolyte is selected from (i) an ionic liquid; (ii) a deep eutectic solvent; and (iii) a solid ionic conductor.

Intercalation compounds can also be produced by introducing a metal through the vapour phase and then reacting these ions. The layers of the intercalation compound can then be separated by stirring in an appropriate solvent, such as NMP [Valles 2008]. An intercalation approach has also been taken to separate graphene oxide aggregates by electrostatically attracting tetrabutylammonium cations in between the layers of the graphene oxide [Ang 2009]. This technique relies on the charges present in graphene oxide to attract the tetrabutylammonium cations.

Wang et al. have shown that ionic liquids are also appropriate solvents for ultrasonic exfoliation because of their stabilising effect on the resultant graphene. In this case, they mixed graphite powder with ionic liquids such as 1-butyl-3-methyl-imidazolium bis(trifluoromethanesulfonyl)imide ([Bmim][Tf$_2$N]) and then subjected the mixture to tip ultrasonication for a total of 60 minutes using 5-10 minute cycles. The resultant mixture was then centrifuged [Wang 2010].

Graphene can also be produced by chemical vapour deposition. For example, methane can be passed over copper [Bae 2010]. Similar methods are also used to form carbon nanotubes [Simate 2010]. However, these methods are typically procedurally complex, require extremely high temperatures (e.g. up to 1000° C.) and usually require elaborate isolation techniques to obtain the material formed.

Alternatively silicon carbide can be decomposed to make a graphene film.

As is clear from the above comments, further methods for the production of graphene/graphite nanoplatelet structures are desired so as to mitigate or obviate the problems identified above. In particular, methods that produce graphene sheets with a controlled number of layers and flake size.

Advantageously, the methods should be scalable to allow for the production of graphene on a large scale. For instance, there is a desire to provide new methods that produce graphene/graphite nanoplatelet structures selectively over other carbon allotropes, which are amenable to scale-up to an industrial platform, which are more efficient, reliable, environmentally friendly, energy efficient, provide higher quality material, provide increased yields of material, provide larger sheets of material, provide easier isolation of material and/or which are procedurally simpler and/or cheaper than the methods of the prior art.

DESCRIPTION OF THE INVENTION

The present disclosure proposes that exfoliation by electrochemical insertion of cations into a negative graphitic electrode should be carried out not with the alkyl ammonium ions discussed above but instead with sulfur-containing cations, especially sulfonium ions. Without wishing to be bound by theory, it is thought that by using this specific class of cations to exfoliate the negative electrode, not only is oxidative attack reduced, or not observed at all (itself surprising given sulfur's oxidative properties), but effective separation of the carbon layers is achieved by virtue of the dissociation of the sulfur-containing cation. Indeed, the inventors have observed the production of small amounts of gas at the cathode (negative electrode) during the exfoliation process, which is believed to be gaseous (sulfur-containing) dissociation product(s). Surprisingly the extent of and the rate of gas production during the exfoliation experiments described herein has been found to be particularly suited to the gradual expansion and exfoliation of the graphitic electrode. That is, experiments have shown that the in-situ sulfur-mediated gas production is not so rapid or energetic as to rupture or fracture the electrode, which would result in a poor yield of graphene and related nanoplatelet structures and/or poor quality materials. Gas production appears to be a direct consequence of the insertion of these particular cations into the negative graphitic electrode and the production of gas species is believed to occur in the inter-layer space caused by (enlarged by) the presence of the sulfur-containing cations in between adjacent carbon layers.

Furthermore, the inventors observe that the effective and reproducible insertion of a sulfur-based cation is surprising because of the large size of sulfur.

The inventors' observation that there is very little, or no, oxidative attack, and little or no observable retention of sulfur in the graphene structure makes this a particularly effective approach to producing high quality graphene.

Thus, the present inventors have found that using sulfur-containing cations permits formation of high quality graphene (few or single layer, with low levels of defects). This high quality material can be produced in significant quantities and is amenable to scale-up.

The present inventors have found that in the context of the electrochemical production of graphene from a negative graphitic electrode (i.e. production of graphene from graphite via a cathodic process), the use of this specific type of cations allows large, controlled expansion of the graphite cathode, the production of gas species acting to urge adjacent carbon layers apart whilst maintaining the integrity of the expanding electrode. This in turn permits further exfoliation towards the core of the electrode—whilst maintaining the "circuit"—the net result being highly effective utilisation of the graphitic starting material.

The inventors note that exfoliation of inner parts of the cathode (those that are initially spaced some distance from the outer electrolyte-contacting surface of the cathode) is surprisingly effective, perhaps because of the additional "force" provided by the production of gaseous species and the forces associated with the transit of gaseous species from the interlayers to the bulk electrolyte.

A further advantage is that the sulfur-mediated exfoliation can be carried out under a normal atmosphere (air), thereby avoiding the need for controlled atmosphere and/or oxygen-free solvents. For example, there is no need to use an air tight container for the process. Nevertheless, the process is flexible such that it is effective under a controlled atmosphere, e.g. an oxygen-free atmosphere, e.g. under nitrogen.

In a first aspect the present invention provides a method for the production in an electrochemical cell of graphene and graphite nanoplatelet structures having a thickness of less than 100 nm, wherein the cell comprises:
(a) a negative electrode which is graphitic;
(b) a positive electrode which may be graphitic or another material; and
(c) an electrolyte which consists of ions in a solvent, where the cations are sulfur-containing ions;
and wherein the method comprises the step of passing a current through the cell to intercalate ions into the graphitic negative electrode so as to exfoliate the graphitic negative electrode.

Thus, the present disclosure provides a convenient, low energy one-step/one-pot process for obtaining graphene and related materials. A further advantage is that a very significant proportion of the graphitic negative electrode can be converted to the desired product.

In contrast to some of the methods referred to above, the method of the present disclosure does not necessarily need high temperature or sonication to achieve exfoliation. Furthermore, significant expansion of the graphite and the breaking apart of the graphitic layers is achieved by ion intercalation without the need for a subsequent reduction step (e.g. calcination).

A related proposal of the present disclosure is that exfoliation by electrochemical insertion of cations into a negative graphitic electrode should be carried out not with the combination of organic ions and metal ions discussed above, but instead with phosphorous-containing cations, especially phosphonium ions. The inventors observe that a metal ion is not needed. Indeed, the phosphorous-containing cation alone is highly effective at producing graphene and graphite nanoplatelets. Without wishing to be bound by theory, it is thought that by using this specific class of cations to exfoliate the negative electrode, not only is oxidative attack reduced, or not observed at all, but effective separation of the carbon layers is achieved by virtue of the dissociation of the phosphorous-containing cation. Indeed, the inventors have observed the production of small amounts of gas at the cathode (negative electrode) during the exfoliation process, which is believed to be gaseous dissociation product(s). Surprisingly, the extent of and the rate of gas production during the exfoliation experiments described herein has been found to be particularly suited to the gradual expansion and exfoliation of the graphitic electrode. That is, experiments have shown that the in-situ phosphorous-mediated gas production is not so rapid or energetic as to rupture or fracture the electrode, which would result in a poor yield of graphene and related nanoplatelet structures and/or poor quality materials.

Gas production appears to be a direct consequence of the insertion of these particular cations into the negative graphitic electrode and the production of gas species is believed to occur in the inter-layer space caused by (enlarged by) the presence of the phosphorous-containing cations in between adjacent carbon layers.

A further advantage is that the phosphorous-mediated exfoliation can be carried out under a normal atmosphere (air), thereby avoiding the need for controlled atmosphere and/or oxygen-free solvents. For example, there is no need to use an air tight container for the process. Nevertheless, the process is flexible such that it is effective under a controlled atmosphere, e.g. an oxygen-free atmosphere, e.g. under nitrogen.

In a further aspect the present invention provides a method for the production in an electrochemical cell of graphene and graphite nanoplatelet structures having a thickness of less than 100 nm, wherein the cell comprises:
(a) a negative electrode which is graphitic;
(b) a positive electrode which may be graphitic or another material; and
(c) an electrolyte which consists of ions in a solvent, where the cations are phosphorous-containing ions and suitably wherein the electrolyte is substantially free of metal cations;
and wherein the method comprises the step of passing a current through the cell to intercalate ions into the graphitic negative electrode so as to exfoliate the graphitic negative electrode.

The present inventors have found that using phosphorous-containing cations in the absence of metal cations permits formation of high quality graphene (few or single layer, with low levels of defects). This high quality material can be produced in significant quantities and is amenable to scale-up.

The present inventors have found that in the context of the electrochemical production of graphene from a negative graphitic electrode (i.e. production of graphene from graphite via a cathodic process), the use of this specific arrangement of cations (phosphorous-containing cations and substantially no metal cations) allows large, controlled expansion of the graphite cathode, the production of gas species acting to urge adjacent carbon layers apart whilst maintaining the integrity of the expanding electrode. This in turn permits further exfoliation towards the core of the electrode—whilst maintaining the "circuit"—the net result being highly effective utilisation of the graphitic starting material.

The inventors note that exfoliation of inner parts of the cathode (those that are initially spaced some distance from the outer electrolyte-contacting surface of the cathode) is surprisingly effective, perhaps because of the additional "urge" provided by the production of gaseous species and the forces associated with the transit of gaseous species from the interlayers to the bulk electrolyte.

The excellent results achieved with just one cation species makes for a simple and scalable process.

Graphene and Graphite Nanoplatelet Structures

In the present application, the term "graphene" is used to describe materials consisting of ideally one to ten graphene layers, preferably where the distribution of the number of layers in the product is controlled. The method can also be used to make graphite nanoplatelet structures under 100 nm in thickness, more preferably under 50 nm in thickness, more preferably under 20 nm in thickness, and more preferably under 10 nm in thickness. The size of the graphene flakes produced can vary from nanometres across to millimetres, depending on the morphology desired.

In embodiments, the material produced is graphene having up to ten layers. The graphene produced may have one, two, three, four, five, six, seven, eight, nine or ten layers. It may be preferred that the material produced is substantially free of graphene oxide. "Substantially free" means less than 10% by weight, preferably less than 5% by weight, more preferably less than 1% by weight of graphene oxide. Additionally or alternatively, preferably the material produced is substantially free of oxygen-containing functional groups. "Substantially free" in the context of oxygen-containing groups means less than 20 at % (atomic percentage) oxygen in the material based on the total number of atoms in the material, preferably less than 10 at %, more preferably less than 6%, and most preferably about the same at % as the graphitic starting material.

In embodiments, the material produced may comprise at least 10% by weight of graphene having up to ten layers, preferably at least 25% by weight and more preferably at least 50% by weight of graphene having up to ten layers.

The process of the present invention produces graphene and/or graphite nanoplatelet structures having a thickness of less than 100 nm. In embodiments, the process produces graphene or graphite nanoplatelet structures having a thickness of less than 100 nm. In embodiments, the process produces graphene and graphite nanoplatelet structures having a thickness of less than 100 nm. In embodiments, the process of the present invention produces graphene. In embodiments, the process produces graphite nanoplatelet structures having a thickness of less than 100 nm. The process of the present invention may for example produce graphene or a combination of graphene and graphite nanoplatelet structures having a thickness of less than 100 nm.

In embodiments, the process produces more graphene by surface area than graphite nanoplatelet structures having a thickness of less than 100 nm, preferably wherein substantially all material produced by the process is graphene by surface area (wherein at least 90%, preferably at least 95%, more preferably at least 98%, e.g. at least 99% of the material produced by the process is graphene by surface area), such as wherein all material produced by the process is graphene. In embodiments, the process produces more graphene by weight than graphite nanoplatelet structures having a thickness of less than 100 nm, preferably wherein substantially all material produced by the process is graphene by weight (wherein at least 90%, preferably at least 95%, more preferably at least 98%, e.g. at least 99% of the material produced by the process is graphene by weight), such as wherein all material produced by the process is graphene. Thus, in some embodiments, the graphene consists of one to five graphene layers, preferably one to four graphene layers, more preferably one to three graphene layers, for instance one to two graphene layers, e.g. one layer. The graphene produced may therefore have one, two, three, four, five, six, seven, eight, nine or ten layers.

The graphene and/or graphite nanoplatelet structures produced by the present process may contain one or more functionalised regions. "Functionalised" and "functionalisation" in this context refers to the covalent bonding of an atom to the surface of graphene and/or graphite nanoplatelet structures, such as the bonding of one or more hydrogen atoms (such as in graphane) or one or more oxygen atoms (such as in graphene oxide) or one or more oxygen-containing groups, etc. Typically, the material produced by the present process is substantially free of functionalisation, for instance, wherein less than 10% by weight, such as less than 5% by weight, preferably less than 2% by weight, more preferably less than 1% by weight of the relevant product is functionalised. Additionally or alternatively the material produced by the present process contains less than 10 at % total non-carbon elements (for example, oxygen and/or hydrogen) based on the total number of atoms in the material, such as less than 5 at %, preferably less than 2 at %, more preferably less than 1 at %.

For instance, in the above aspect and embodiments it may be preferred that the material produced is substantially free of graphene oxide (i.e. wherein less than 10% by weight, such as less than 5% by weight, preferably less than 2%, more preferably less than 1% by weight of the material produced is graphene oxide). Alternatively or additionally it may be preferred that the material produced is substantially free of oxygen-containing groups such that the material contains less than 20 at % (atomic percentage) oxygen in the material based on the total number of atoms in the material, preferably less than 10 at %, more preferably less than 6%, and more preferably about the same, or less, at % as the graphitic starting material. In embodiments, the material contains less than 5 at %, preferably less than 2 at %, preferably less than 1 at % and most preferably less than 0.5 at % oxygen in the material.

The functionalisation, where present, may occur on the material surface and/or near or at the grain boundary. Typically, the functionalisation, where present, occurs at the grain boundary but not on the material surface. In preferred embodiments, the graphene produced by the present process is not functionalised.

In other embodiments, it may be desirable to have higher levels of functionalisation. For example, the method may include functionalising the material in the cell. Thus, in embodiments, the graphene and/or graphite nanoplatelet structures produced by the present process contain one or more functionalised regions such that more than 10% by weight, suitably more than 15% by weight, suitably more than 20% by weight, suitably more than 30% by weight, suitably more than 40% by weight, of the relevant product is functionalised. Additionally or alternatively the material produced by the present process contains more than 5 at % total non-carbon elements (for example, oxygen and/or hydrogen) based on the total number of atoms in the material, suitably more than 10 at %, preferably more than 15 at %, preferably more than 20 at %, and more preferably more than 30 at %. The functionalised regions may for example comprise oxygen-containing groups covalently bonded to the carbon, or hydrogen bonded to the carbon. Thus, in embodiments, the material can be functionalised with hydrogen to produce a material having an extent of hydrogenation that lies between graphene and graphane. In this way, the properties of the material can be tailored.

The atomic composition of material produced by the present process may be quantified by X-ray photoelectron spectroscopy (XPS). Raman spectroscopy (as described in the Examples) may be used to determine the level of defects in the material.

In embodiments, the material produced by the present process includes at least 10% by weight of graphene having up to ten layers, preferably at least 25% by weight more preferably at least 50% by weight of graphene having up to ten layers, preferably at least 60% by weight, at least 70% by weight, at least 80% by weight, at least 90% by weight, at least 95% by weight, at least 98% by weight, more preferably at least 99% by weight. In embodiments, graphene is produced in the absence of graphite nanoplatelet structures.

The graphite nanoplatelet structures have a thickness of less than 100 nm. In embodiments, the graphite nanoplatelet structures are ≤90 nm thick, such as ≤80, ≤70, ≤60, ≤50, ≤40, ≤30 or ≤20 nm thick, preferably ≤10 nm thick and more preferably ≤1 nm thick.

Typically, the process of the present invention produces flakes of graphene on the electrode and/or in the electrolyte. The size of the graphene flakes produced can vary from nanometres across to millimetres, depending on the morphology desired. The flakes produced are desirably at least 90 μm in length, such as at least 80 μm, 70 μm, 60 μm, 50 μm, 40 μm, 30 μm, 20 μm, 10 μm, or 5 μm, for example at least 1 μm. In embodiments, the flakes produced are 1 to 100 μm in length, such as 1 to 90 μm, 1 to 80 μm, 1 to 70 μm, 1 to 60 μm, 1 to 50 μm, 1 to 40 μm, 1 to 30 μm, 1 to 20 μm, 1 to 10 μm, or 1 to 5 μm in length.

Negative Electrode

The negative electrode is the electrode held at the more negative potential out of the negative and positive electrodes. An additional reference electrode may also be used (which may be any suitable material, such as Ag/AgBF$_4$).

The negative electrode may comprise a layered graphite compound in which cations can be intercalated. Preferred materials include highly ordered pyrolytic graphite (HOPG), natural and synthetic graphite. The electrode may be a single graphitic crystalline flake or many flakes held together. In the latter case, the crystals may be placed on a conductive surface, physically pressed together or held together using a binder such a pyrolysed polymer (e.g. an extruded graphite rod). They also may be held together in a porous box or basket. The minimum lateral dimensions of the graphite flakes are preferably at least 1 nm, more preferably at least 100 nm and most preferably at least 1 micron. The maximum lateral dimensions of the graphite flakes are preferably no more than 10 cm, more preferably no more than 1 mm and most preferably no more than 100 microns. In one embodiment, the flakes are orientated so that the [002] direction is parallel to the surface of the electrode, exposing the galleries for intercalation. In further embodiments, the maximum lateral dimensions of the graphite flakes are preferably no more than 1 micron or 10 microns.

The negative electrode material may be treated prior to use in order to improve its electrochemical exfoliation. In one embodiment the electrode is made from material which has been previously partially exfoliated using other methods such gaseous expansion or intercalation from the vapour phase. For example, commercially available material from companies such as XG Sciences and Angstrom could be used for the electrode material.

In some embodiments, the negative electrode may be of a ladle design to avoid issues with disintegration of the electrode into large pieces. In other embodiment, the graphite negative electrode may be held at a liquid-liquid interface. In such an embodiment, the negative electrode may be a liquid metal such as mercury or gallium on which graphite flakes are placed, allowing continual contact with the graphitic material as it is exfoliated into the desired material.

In some embodiments, the negative electrode may be surrounded by a membrane. Without wishing to be bound by theory, the use of a membrane may help retain any exfoliated material in electrical contact with the negative electrode allowing for further intercalation of the cations. In some embodiments, the pore size of the membrane may vary from 10 nm to 500 nm. Suitable membranes include (a) cellulose dialysis membrane (e.g., Spectra Por 7, 25 nm pores); and (b) polycarbonate membranes (e.g. 450 nm pores) and (c) muslin cloth.

Positive Electrode

The positive electrode is the electrode held at the more positive potential of the two (negative and positive) electrodes.

The positive electrode may consist of any suitable material known to those skilled in the art as it does not play a role in the graphene production, other than to provide a counter electrode for the anions. Preferably, the positive electrode is made from an inert material such as gold, platinum or carbon.

When the reaction at the positive electrode generates a gas the electrode surface area is as large as possible to prevent gas bubbles wetting it and/or disrupting the process at the negative electrode. The positive and/or reference electrode may also be placed in a membrane or molecule sieve to prevent undesired reactions in the electrolyte or at either electrode. The positive and the negative electrodes could alternatively be placed in a two-compartment cell, wherein the each compartments contains one electrode, and the compartments are connected through a channel.

Electrolyte

In the first aspect, the electrolyte comprises ions in a solvent, where the cations are sulfur-containing ions.

The sulfur-containing cations are suitably organosulfur cations (characterised by the presence of a C—S bond). Examples of organosulfur cations include sulfonium ions and thio-heterocyclic ions (i.e. cations where the sulfur is part of a heterocyclic ring). The heterocycles are suitably 5 to 10 membered rings, preferably 5 to 8, more preferably 5 to 7, more preferably 5 or 6 membered rings. An example of a thio-heterocyclic cation is thiopyrylium.

The sulfur-containing cations are preferably sulfonium ions. Sulfonium ions have three organic substituents attached to a sulfur atom. Sulfonium ions can be represented by the formula: $[R_3S]^+$. Each of the organic substituents (each of the R groups) can be the same or different. Each can be selected independently of the others.

Suitably each of the organic substituents (R groups) is independently selected from organic substituents containing up to 100 carbon atoms, more preferably up to 20 carbon atoms, more preferably between 1 and 10 carbon atoms, more preferably between 1 and 8 carbon atoms, more preferably between 1 and 6 carbon atoms, more preferably between 1 and 4 carbon atoms, and most preferably 1 or 2 carbon atoms.

Suitable organic substituents (R groups) include alkyl (including branched and unbranched; cyclic and aliphatic alkyl). Typically, each of the organic substituents (each of the R groups) is independently selected from alkyl, preferably C1-C6 alkyl, more preferably C1-C5 alkyl, more preferably C1-C4 alkyl, more preferably C1-C3 alkyl, more preferably C1-C2 alkyl and more preferably C1 alkyl (methyl). Each alkyl group may independently be substituted or unsubstituted. Typical substituents include halo, especially F, Cl and Br) and hydroxide. Suitably the alkyl group is unsubstituted.

Suitably all of the organic substituents (all of the R groups) are the same. It is particularly preferred that they are all alkyl.

Particularly preferred sulfur-containing cations are triethyl sulfonium and trimethyl sulfonium.

The electrolyte may comprise 2 or more different sulfur-containing cations, for example 3 or more, 4 or more, or 5 or more different sulfur-containing cations.

Preferably the electrolyte is entirely free of metal cations. That is, the electrolyte contain may contain only non-metal cations.

In embodiments, the cations of the electrolyte (cations in the solvent) consist essentially of, preferably consist of, sulfur-containing cations, suitably sulfonium ions.

The counter-ions for the sulfur-containing cations may be any suitable counter ion. Suitable counter-ions include bis(trifluoromethylsulfonyl)imide, bromide, tetrafluoroborate ($BF_4^-$), perchlorate ($ClO_4^-$) or hexafluorophosphate ($PF_6^-$). Other soluble, inorganic ions may be used, such as tetraphenyl borate or chloride. Suitably the counter-ions should not be those that can attack the graphite.

In the further aspect in which phosphorous-containing cations are used, the electrolyte comprises ions in a solvent, where the cations are phosporous-containing ions.

The phosporous-containing cations are preferably phosphonium ions. Phosphonium ions have four organic substituents attached to a sulfur atom. They are also known as organic quaternary phosphonium cations. Phosphonium ions can be represented by the formula: $[R_4P]^+$. Each of the organic substituents (each of the R groups) can be the same or different. Each can be selected independently of the others.

Suitably each of the organic substituents (R groups) is selected independently from organic substituents containing up to 100 carbon atoms, more preferably up to 20 carbon atoms, more preferably between 1 and 10 carbon atoms, more preferably between 1 and 8 carbon atoms, more preferably between 1 and 6 carbon atoms, more preferably between 1 and 4 carbon atoms, and most preferably 1 or 2 carbon atoms.

Suitable organic substituents (R groups) include alkyl (including branched and unbranched; cyclic and aliphatic alkyl). Typically, each of the organic substituents (each of the R groups) is independently selected from alkyl, preferably C1-C6 alkyl, more preferably C1-C5 alkyl, more preferably C1-C4 alkyl, more preferably C1-C3 alkyl, more preferably C1-C2 alkyl and more preferably C1 alkyl (methyl). Each alkyl group may independently be substituted or unsubstituted. Typical substituents include halo, especially F, Cl and Br) and hydroxide. Suitably the alkyl group is unsubstituted.

Suitably all of the organic substituents (all of the R groups) are the same. It is particularly preferred that they are all alkyl.

Particularly preferred phosphorous-containing cations are tetrabutyl phosphonium, tetraethyl phosphonium, and tetramethyl phosphonium.

The electrolyte may comprise 2 or more different phosphorous-containing cations, for example 3 or more, 4 or more, or 5 or more different phosphorous-containing cations.

In embodiments, the cations of the electrolyte (cations in the solvent) consist essentially of, preferably consist of, phosphorous-containing cations, suitably phosphonium ions.

Suitably the electrolyte is entirely free of metal cations. That is, the electrolyte contains only non-metal cations.

The counter-ions for the phosphorous-containing cations may be any suitable counter ion. Suitable counter-ions include hydroxide, bromide, tetrafluoroborate ($BF_4^-$), perchlorate ($ClO_4^-$) or hexafluorophosphate ($PF_6^-$). Other soluble, inorganic ions may be used, such as tetraphenyl borate or chloride. Suitably the counter-ions should not be those that can attack the graphite.

Suitably the solvent is a non-aqueous solvent, for example an organic solvent. Suitably, the solvent is a polar, aprotic solvent.

Solvents which can be used include NMP (N-methyl-2-pyrrolidone), DMSO (dimethyl sulfoxide), DMF (N,N'-dimethyl formamide) and mixtures thereof, which are examples of organic solvents. In one embodiment, the solvent used has an affinity for graphene or graphite nanoplatelet structures so that the material produced at the electrode is taken away by the solvent. In another embodiment, the solvent has no affinity for graphene or graphite nanoplatelet structures, so that the material produced falls to the bottom of the electrochemical cell, allowing easy collection of the graphene produced.

In embodiments, the concentration of the phosphorous-containing cations may be a minimum of 1 mM, 0.1 M, 0.2 M or 0.5 M. The maximum concentration may be 4M, 2M, 1.5M or 1M.

Cell Potential and Current Density

The working potential of the cell will be at least that of the standard potential for reductive intercalation. An overpotential may be used in order to increase the reaction rate and to drive cations into the galleries of the graphite at the negative electrode. Preferably an overpotential of 1 mV to 15 V is used against a suitable reference as known by those skilled in the art, more preferably 1 mV to 12 V, more preferably 1 mV to 10 V and more preferably 1 mV to 5 V. In cells with only two terminals, and no reference, a larger potential may be applied across the electrodes but a significant amount of the potential drop will occur over the cell resistance, rather than act as an overpotential at the electrodes. In these cases the potential applied may be up to 20V or 30V. In embodiments the potential applied to the negative electrode (i.e. the electrode at which the cathodic process of intercalation occurs) is in the range from −20 to 20V, suitably from −15 to 15V, suitably from −12 to 15V, suitably −12 to 12V and preferably from about −10 to about 10V.

Naturally, even when the potential applied to the negative electrode is negative, the potential difference (ΔV) across the positive and negative electrodes will still be such that cathodic processes occur at the negative graphitic electrode. This means that in practice if the negative electrode is at a negative potential, the positive electrode will be at a less negative potential or at zero or a positive potential.

Typically, current is allowed to pass between the electrodes at a potential difference of from 1 to 20 V, such as from 1 to 15V, for example 1 to 12V, for example 1 to 10V, for example 2 to 10V, for example 2 to 8 V, for example 2 to 5 V, e.g. 3 to 5 V. For instance, the current allowed to pass between the electrodes may be at a potential difference of about 1 V, about 2 V, about 3 V, about 4 V, about 5 V, about 6 V, about 7 V, about 8 V, about 9 V, about 10 V, about 11 V, about 12 V, about 13 V, about 14 V, about 15 V, about 16 V, about 17 V, about 18 V, about 19 V, or about 20V. Typically, the current is allowed to pass between the electrodes at a potential difference of about 10 V.

The voltage applied across the electrodes may be cycled or swept. In one embodiment, both the electrodes are graphitic and the potential is swept so that electrodes change from positive to negative and vice versa. In this embodiment the cationic exfoliation would occur at both electrodes, depending on the polarity of the electrode during the voltage cycle. In some embodiments, alternating current can be used to allow for both fast intercalations and de-intercalations.

The current density at the negative electrode will be controlled through a combination of the electrode's surface area and overpotential used. The method can also be carried out under current control.

Operating Temperature

The cell is operated at a temperature which allows for production of the desired material.

The cell may be operated at a temperature of at least 10° C., preferably at least 20° C. The maximum cell operating temperature may be 150° C., preferably 100° C., and more preferably 90° C., 80° C., 70° C. or 50° C. In some embodiments, the cell may be operated at a temperature of at least 30, 40 or 50° C. The maximum cell operating temperature may be as high as 120° C. The optimum operating temperature will vary with the nature of the electrolyte. Operating the cell up to the boiling point of the electrolyte may be carried out in the present invention.

The temperature within the electrochemical cell may thus be at least 10° C., preferably at least 20° C. For instance, the temperature within the electrochemical cell may be cell room temperature. In some embodiments, the temperature within the electrochemical cell is at least 30° C., 40° C., 50° C., 60° C., 70° C., 80° C., 90° C. or 100° C. In the case of molten salts, the temperature within the cell may for example be up to 1500° C. In some embodiments, the temperature within the cell does not exceed 1000° C., 900° C., 800° C. or 700° C., preferably the cell operating temperature does not exceed 650° C., 600° C., 550° C., 500° C., 450° C., 400° C., 350° C., 300° C., 250° C., 200° C., 150° C. or more preferably 120° C. In other embodiments, the temperature within the cell does not exceed 110° C., more preferably the temperature within the cell does not exceed 100° C., 90° C., 80° C., 70° C., 60° C. or more preferably 50° C.

Operating Pressure

The electrochemical cell may be operated at any suitable pressure, for example atmospheric/ambient pressure, that allows for production of the desired graphene/graphite nanoplatelet structures.

Operating Atmosphere

The electrochemical cell may be operated under any suitable gaseous atmosphere. For example, the electrochemical cell in processes of the invention may be operated under an anhydrous atmosphere, such as under nitrogen, and/or argon. In alternative embodiments, the electrochemical cell is operated under air.

Duration of Reaction

The electrochemical process may be operated for a length of time adequate to provide a desirable yield of graphene and/or graphite nanoplatelet structures. The duration of the process typically refers to the length of time that a current is passed between the electrodes prior to isolation of the graphene/graphite nanoplatelet structures. The current may be passed between the electrodes continuously or intermittently, typically continuously.

In some embodiments, the length of time that a current is passed between the electrodes is greater than one minute, preferably greater than 5 min, 10 min, 20 min, 30 min, 40 min, 50 min preferably greater than one hour. Typically, the reaction duration from 1 h to 72 h, such as from 1 h to 48 h, for instance 1 h to 24 h. In further embodiments, the length of time that a current is passed between the electrodes is from 1 h to 10 h, 1 h to 5 h or 1 h to 4 h. Typically the length of time that a current is passed between the electrodes is about 3 h. In alternative embodiments, the reaction is continuous.

Recovery of Cations

In one embodiment, the cations used for the exfoliation are recovered after exfoliation. The cations may be recovered by washing and/or heating of the exfoliated material, electrochemical reduction of the cations, ultrasonic energy treatment of the exfoliated material, displacement from the exfoliated material by surfactants or combinations thereof.

Further Method Steps

In one embodiment, organic ions may be added in a second stage, in order to favour the exfoliation of graphite through a process of polymerization and expansion between the graphene layers. Suitable organic ions include monomers for polymerisation possessing electron-withdrawing groups such as nitrile, carboxyl, phenyl, and vinyl.

The graphene and graphite nanoplatelet structures having a thickness of less than 100 nm produced by the method of the invention may be separated from the electrolyte by a number of separation techniques, including:

(a) filtering;
(b) using centrifugal forces to precipitate the graphene or graphite nanoplatelet structures;
(c) collecting the graphene or graphite nanoplatelet structures at the interface of two immiscible solvents; and
(d) sedimentation.

The electrochemically exfoliated graphene or graphite nanoplatelet structures may be further treated after exfoliation. For example, the materials may be further exfoliated using ultrasonic energy and/or thermal energy (e.g. to cause expansion) and other techniques known to those skilled in the art to decrease the flake size and number of graphene layers.

In some embodiments, the electrochemical intercalation may be repeated in order to achieve full exfoliation.

The graphite at the negative electrode may be functionalised electrochemically prior to its exfoliation, for example, by oxidation in nitric acid or fluorination using hydrofluoric acid. In these cases the negative electrode would become the positive electrode during the functionalisation. In some circumstances, as noted above, the voltage may be reversed to cycle the electrochemical exfoliation and functionalisation steps.

In embodiments, the method includes the step of recovering the electrolyte, which suitably includes separating solid material (typically graphene and graphene related products) from the electrolyte. In embodiments, the method includes the step of re-using the electrolyte in a subsequent electrochemical cell process.

In some embodiments, the process further includes the step of isolating the graphene/graphite nanoplatelet structures. For instance, in some embodiments the present invention provides a process as described above wherein the process further includes the steps of isolating the graphene and/or graphite nanoplatelet structures produced.

Where the graphene/graphite nanoplatelet structures are suspended in the electrolyte or have fallen to the floor of the electrochemical cell, isolation of the graphene/graphite nanoplatelet structures can be achieved by separation from the electrolyte according to a number of separation techniques, including:

(a) filtering;
(b) using centrifugal forces to precipitate/accumulate the graphene or graphite nanoplatelet structures; and
(c) collecting the graphene or graphite nanoplatelet structures at the interface of two immiscible solvents.

In some embodiments the graphene/graphite nanoplatelet structures are isolated by filtration. Typically, the graphene/graphite nanoplatelet structures are isolated by filtration using a fine membrane material, such as Anopore™ inorganic membrane (i.e. Anodisc™ which is commercially available from GE Healthcare).

The process may include the further step of manipulating the graphene/graphite nanoplatelet structures either prior to isolation (such as in the electrochemical cell), or after isolation from the electrochemical cell. For example, the graphene/graphite nanoplatelet structures may be washed to remove contaminants prior to or following isolation, for instance to remove residual electrolyte from the product surface. In embodiments, the process includes the step of forming and/or shaping the graphene/graphite nanoplatelet structures prior to, or following, isolation, such as forming and/or shaping the graphene into an article.

In embodiments, the process includes the step of incorporating the graphene and or graphite nanoplatelet structures into an article.

In a further aspect of the invention is provided graphene and/or graphene nanoplatelet structures prepared according to a process as described in any of the above aspects and embodiments. In a further aspect, the invention provides a composition including graphene and/or graphite nanoplatelet structures prepared according to a process as described in any of the above aspects and embodiments. In a still further aspect is provided an article including said composition or said graphene and/or graphite nanoplatelet structures prepared according to a process as described in any of the above aspects and embodiments, or, optionally, a derivative of said composition or graphene and/or graphite nanoplatelet structures.

The skilled person will understand that the above embodiments are described by way of example only. Other embodiments falling within the scope of the claims will be apparent to the skilled reader. It will be appreciated that the features specified in each aspect and embodiment may be combined with other specified features in other embodiments, to provide further embodiments.

Figure 1:
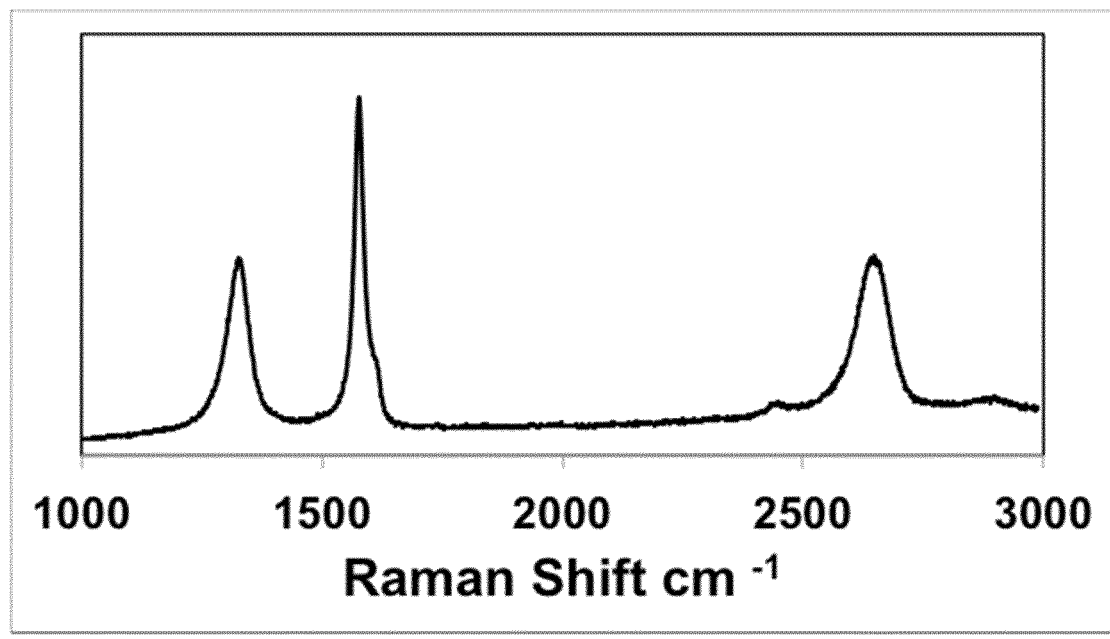
FIG. 1 shows a typical Raman spectrum of the product produced in Example 1.

The present invention is described in more detail by way of example only with reference to the following Examples.

EXAMPLES

General Electrochemical Procedure

All the electrochemical experiments were conducted in 50 ml beakers. The beaker was sealed using rubber plug or custom-made plastic lid. The electrodes are fixed on the lid so that the electrode distance is fixed at 5 mm at the start of the run. To control the surface area of the electrodes, the electrodes were attached to stainless steel rods that are allowed to move vertically using a M4 screw threaded onto the lid.

Analysis of Graphene by Raman Spectroscopy

All the Raman spectroscopy was conducted using a 633 nm excitation laser.

It is well established in the literature that Raman spectroscopy can be used to determine the number of layers that a carbon flake possesses through the shape, intensity and position of the D ($\sim$1350 cm$^{-1}$), G ($\sim$1580 cm$^{-1}$) and 2D ($\sim$2700 cm$^{-1}$) peaks (the 2D peak may be alternatively referred to as the G' peak).

The exact positions of the Raman peaks depend on the excitation wavelength used and the level of doping in the sample [Ferrari 2006]. In general, the Raman spectrum for single layer graphene comprises a 2D peak which can be fitted with a single component and is similar or higher in intensity than the G peak. The 2D peak for monolayer graphene occurs at approximately 2637 cm$^{-1}$ when measured using a 633 nm excitation laser. As the number of layers increase, the 2D peak decreases in relative intensity to the G peak.

The 2D peak would be expected to be centred at approximately 2637, 2663, 2665, 2675 and 2688 cm-1 for 1-layer, 2-layer, 3-layer, many-layer and graphite respectively using a 633 nm laser to measure graphene flakes deposited on an oxide-covered silicon wafer.

The intensity of the D peak relative to the G peak also provides an indication of the number of structural defects such as graphene edges and sub-domain boundaries in the material produced. A D peak to G peak ratio (ID/IG) of around 0.2 may be expected for pristine graphene and the lower the ratio the better the quality material produced [Malard 2009].

For comparison, pristine defect-free graphite generally shows two bands: one at 1580 cm$^{-1}$ (the G band), which arises from the first order scattering of the E2g phonon of sp2-bonded carbon atoms; and a band at $\sim$2680 cm$^{-1}$ (the 2D band) corresponding to the double-resonance process.

Example 1

An electrochemical cell was assembled having a graphite rod as cathode, and Pt wire as anode. The electrolyte was 0.5 M tetrabutylphosphonium hydroxide in DMSO. A potential of 10 V was applied for 5 hours. Very small bubbles were observed on the cathode. After the electrolysis, the suspension produced was mixed with 2 L of water and then the powder was filtered out. The powder was then washed with water several times, and dried overnight at 60° C. under vacuum.

After electrochemical exfoliation, the Raman pattern shows characteristic graphene features: a large symmetrical peak at 2655 cm$^{-1}$. This is indicative of 1- and 2-layer graphene.

Example 2

Figure 2:
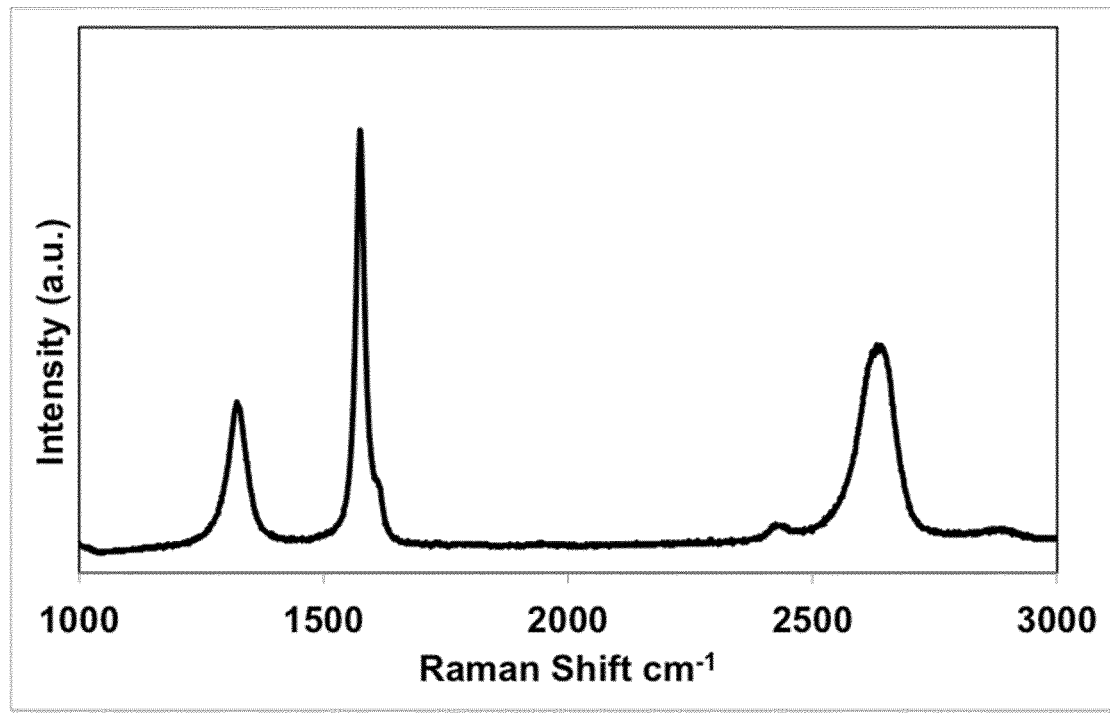
FIG. 2 shows a typical Raman spectrum of the product produced in Example 2.

The cell and conditions were the same as Example 1 except the electrolyte was 1 M triethylsulfonium bis(trifluoromethylsulfonyl) imide in DMSO. After cleaning the sample Raman analysis was carried out. The Raman pattern (FIG. 2) shows the graphene features, i.e large G band at 1585 cm$^{-1}$ and large symmetrical 2D band at $\sim$2651 cm$^{-1}$. Again, this is indicative of high quality 1- and 2-layer graphene.

Example 3

Figure 3:
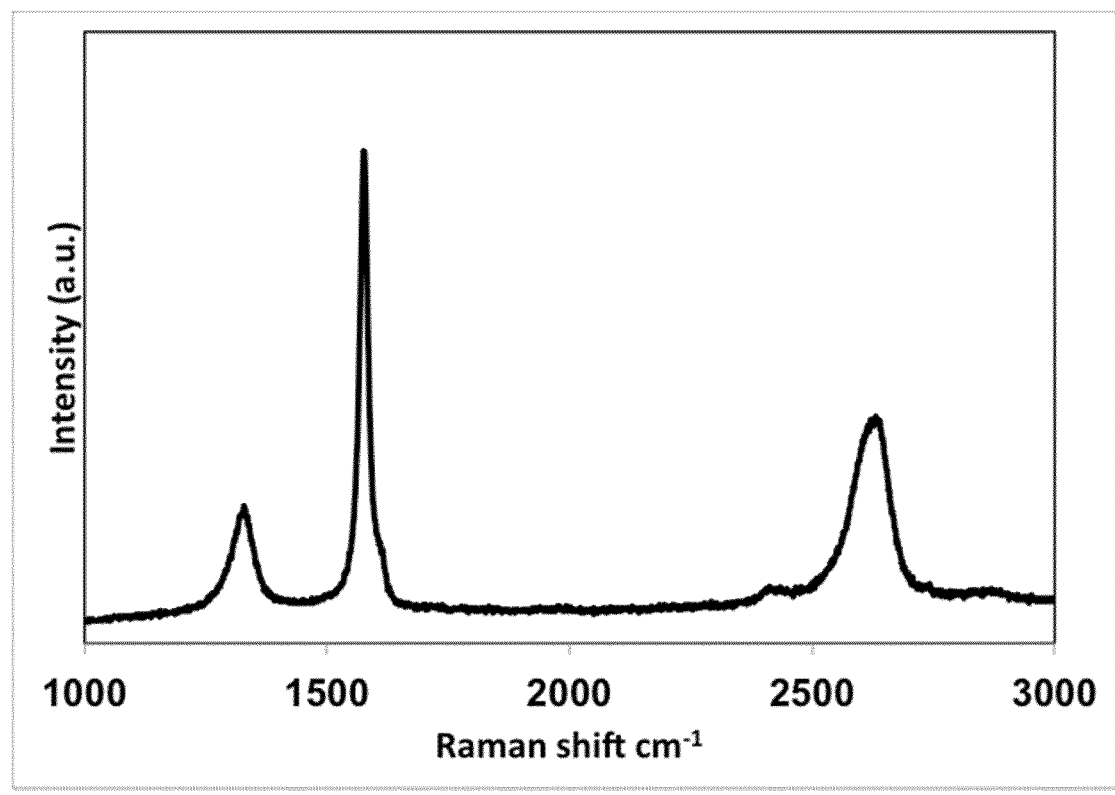
FIG. 3 shows a typical Raman spectrum of the product produced in Example 3.

The cell and conditions were the same as Example 1 except the electrolyte was 0.5 M of trimethylsulfonium bromide in DMSO. The Raman analysis (FIG. 3) shows similar results to that of Examples 1 and 2, being indicative of high quality (few layer) graphene.

REFERENCES

The following documents are all incorporated herein by reference.

[Novoselov 2004] Electric field effect in atomically thin carbon films, K. S. Novoselov et al., Science, 2004, 5296, pp 666-669.

[Ruoff 2009] Chemical methods for the production of graphenes, S. Park and R. S. Ruoff, Nature Nanotechnology, 2009, DOI:10.1038/nnano.2009.58

[Bae 2010] Roll-to-roll production of 30-inch graphene films for transparent electrodes, S. Bae et al. Nature Nanotechnology, 2010, DOI: 10.1038/NNANO.2010.132

[Ang 2009] High-Throughput Synthesis of Graphene by Intercalation-Exfoliation of Graphite Oxide and Study of Ionic Screening in Graphene Transistor, P. K. Ang et al., ACS Nano, 2009, 3(11), pp. 3587-3594

[Wang 2010] Direct exfoliation of natural graphite into micrometre size few layers graphene sheets using ionic liquids, X. Wang et al., Chem. Commun., 2010, 46, pp. 4487-4489

[Liu 2008] N. Liu et al, One-Step Ionic-Liquid-Assisted Electrochemical Synthesis of Ionic-Liquid-Functionalized Graphene Sheets Directly from Graphite. Adv. Funct. Mater. 2008, 18, pp. 1518-1525

[Lu 2009] One-Pot Synthesis of Fluorescent Carbon Nanoribbons, Nanoparticles, and Graphene by the Exfoliation of Graphite in Ionic Liquids, ACS Nano, 2009, 3(8) pp. 2367-2375

[Kinloch, 2003] I. A. Kinloch et al, Electrolytic, TEM and Raman studies on the production of carbon nanotubes in molten NaCl, Carbon, 2003, 41, pp. 1127-1141

[Coleman 2008 & 2009] Y. Hernandez, et al, Nat. Nanotechnol., 2008, 3, 563; M. Lotya, et al, J. Am. Chem. Soc., 2009, 131, 3611.

[Valles 2008] Valles, C. et al. Solutions of negatively charged graphene sheets and ribbons. J. Am. Chem. Soc. 130, 15802-15804 (2008).

[Ferrari 2006] Ferrari, A. C. et al. Raman Spectrum of Graphene and Graphene Layers. Phys Rev Lett, 97 (2006), 187401

[Wang 2011] Wang, J., et al., High-yield synthesis of few-layer graphene flakes through electrochemical expansion of graphite in propylene carbonate electrolyte, JACS, 2011, 133, 8888-8891

[Simate 2010] The production of carbon nanotubes from carbon dioxide: challenges and opportunities, Simate, G. S. et al. Journal of Gas Chemistry, 2010, 19(5), 453;

[Malard 2009] Malard L. M. et al., Raman spectroscopy in graphene, Phys. Rep. 473, 51-87 (2009).

[Zhong 2012] Y. L. Zhong, T. M. Swager, J. Am. Chem. Soc. 2012, 134, 17896-17899

[Huang 2012] Huang et al, J. Mater. Chem., 2012, 22, 10452-10456

[Wang 2010] Wang Y, Xu X, Lu J, Lin M, Bao Q, Vñzyilmaz B, Loh K P. Toward High Throughput Interconvertible Graphane-to-Graphene Growth and Patterning. ACS Nano 2010; 4:6146.

The invention claimed is:

1. A method for the production in an electrochemical cell of graphene and graphite nanoplatelet structures having a thickness of less than 100 nm, wherein the electrochemical cell comprises:
   (a) a negative electrode which is graphitic;
   (b) a positive electrode which may be graphitic or another material; and
   (c) an electrolyte having ions in a solvent, wherein the ions include cations and counteranions, and wherein the cations are sulfur-containing cations;

and wherein the method comprises the step of passing a current through the electrochemical cell to intercalate ions into the graphitic negative electrode so as to exfoliate the graphitic negative electrode.

2. A method according to claim 1, wherein the sulfur-containing cations are organosulfur cations.

3. A method according to claim 2, where the organosulfur cations are sulfonium ions.

4. A method according to claim 3, wherein the sulfonium ions are trialkyl sulfonium ions.

5. The method according to claim 4 wherein the trialkyl sulfonium ions are triethyl sulfonium or trimethyl sulfonium.

6. A method according to claim 1, wherein the counteranions are selected from bis(trifluoromethylsulfonyl)imide, bromide, tetrafluoroborate ($BF_4^-$), perchlorate ($ClO_4^-$) and hexafluorophosphate ($PF_6^-$).

7. A method according to claim 1, wherein the solvent is a non-aqueous solvent.

8. The method according to claim 7 wherein the non-aqueous solvent is dimethyl sulfoxide, N-methyl-2-pyrrolidone, N,N'-dimethyl formamide or mixtures thereof.

9. A method for the production in an electrochemical cell of graphene and graphite nanoplatelet structures having a thickness of less than 100 nm, wherein the electrochemical cell comprises:
   (a) a negative electrode which is graphitic;
   (b) a positive electrode which may be graphitic or another material; and
   (c) an electrolyte having ions in a solvent, wherein the ions include cations and counteranions, and wherein the cations are phosphorous-containing ions and wherein the electrolyte is substantially free of metal cations;

and wherein the method comprises the step of passing a current through the electrochemical cell to intercalate ions into the graphitic negative electrode so as to exfoliate the graphitic negative electrode.

10. A method according to claim 9, wherein the phosphorous-containing cations are phosphonium ions.

11. A method according to claim 10, where the phosphonium ions are tetraalkyl phosphonium ions.

12. A method according to claim 11, wherein the tetraalkyl phosphonium ions are selected from tetrabutyl phosphonium, tetraethyl phosphonium and tetramethyl phosphonium.

13. A method according to claim 9, wherein the counteranions are selected from hydroxide, bromide, tetrafluoroborate ($BF_4^-$), perchlorate ($ClO_4^-$) and hexafluorophosphate ($PF_6^-$).

14. A method according to claim 9, wherein the solvent is a non-aqueous solvent.

15. The method according to claim 14 wherein the non-aqueous solvent is dimethyl sulfoxide, N-methyl-2-pyrrolidone, N,N'-dimethyl formamide or mixtures thereof.

16. A method according to claim 9, wherein the negative electrode is an electrode comprising one or more selected from highly ordered pyrolytic graphite, natural graphite and synthetic graphite.

17. A method according to claim 9, which is carried out a temperature from 20° C. to 150° C.

18. A method according to claim 9, wherein the graphene or graphite nanoplatelet structures having a thickness of less than 100 nm are separated from the electrolyte by at least one technique selected from:
  (a) filtering;
  (b) using centrifugal forces to precipitate the graphene or graphite nanoplatelet structures; and
  (c) collecting the graphene or graphite nanoplatelet structures at the interface of two immiscible solvents.

19. A method according to claim 9, wherein the electrochemically exfoliated graphene or graphite nanoplatelet structures are further treated using ultrasonic energy and/or thermal energy.

20. A method according to claim 9, wherein the method further includes the step of isolating the graphene or graphite nanoplatelet structures.

* * * * *